(12) United States Patent
Carlson et al.

(10) Patent No.: US 8,632,054 B2
(45) Date of Patent: Jan. 21, 2014

(54) VALVE ACTUATOR ASSEMBLY WITH TOOL-LESS INTERCONNECT

(75) Inventors: Nathan Carlson, Maple Grove, MN (US); Tom Bakken, Apple Valley, MN (US); Alan Stordahl, Eagen, MN (US)

(73) Assignee: Honeywell International Inc., Morristown, NJ (US)

( * ) Notice: Subject to any disclaimer, the term of this patent is extended or adjusted under 35 U.S.C. 154(b) by 316 days.

(21) Appl. No.: 13/032,856

(22) Filed: Feb. 23, 2011

(65) Prior Publication Data

US 2012/0211688 A1    Aug. 23, 2012

(51) Int. Cl.
*F16K 31/00*    (2006.01)

(52) U.S. Cl.
USPC ....... 251/292; 251/129.11; 251/128; 251/304

(58) Field of Classification Search
USPC .......... 251/291–292, 129.02, 129.11, 129.21, 251/95, 128, 304; 335/255
See application file for complete search history.

(56) References Cited

U.S. PATENT DOCUMENTS

| | | | |
|---|---|---|---|
| 2,616,452 A * | 11/1952 | Clay et al. | 251/129.21 |
| 3,117,257 A * | 1/1964 | Stone | 335/245 |
| 3,262,027 A * | 7/1966 | Zaleske et al. | 335/261 |
| 3,295,079 A * | 12/1966 | Brown | 335/255 |
| 3,727,160 A * | 4/1973 | Churchill | 335/251 |
| 4,549,446 A | 10/1985 | Beeson | |
| D286,907 S | 11/1986 | Hilpert et al. | |
| 4,671,540 A | 6/1987 | Medvick et al. | |
| 4,683,453 A * | 7/1987 | Vollmer et al. | 335/255 |
| D295,280 S | 4/1988 | Waiser | |
| 4,805,870 A * | 2/1989 | Mertz | 251/129.15 |
| 4,836,497 A | 6/1989 | Beeson | |
| 5,133,265 A | 7/1992 | Lahti et al. | |
| 5,236,006 A * | 8/1993 | Platusich et al. | 137/375 |
| 5,518,462 A | 5/1996 | Yach | |
| 5,540,414 A * | 7/1996 | Giordani et al. | 251/174 |
| 5,551,477 A | 9/1996 | Kanno et al. | |
| 5,564,461 A | 10/1996 | Raymond, Jr. et al. | |
| 5,581,222 A * | 12/1996 | Pinaud | 335/278 |
| 5,634,486 A | 6/1997 | Hatting et al. | |

(Continued)

FOREIGN PATENT DOCUMENTS

| | | |
|---|---|---|
| EP | 0612950 A1 | 8/1994 |
| EP | 1235128 A2 | 8/2002 |

(Continued)

OTHER PUBLICATIONS

"Smart-T and MT-Adapt-HW Mounting Adapter," 1 page, prior to Feb. 23, 2011.

(Continued)

*Primary Examiner* — John K Fristoe, Jr.
*Assistant Examiner* — Marina Tietjen
(74) *Attorney, Agent, or Firm* — Seager Tufte & Wickhem LLC

(57) ABSTRACT

A valve actuator assembly may include a valve having a mounting adapter and an actuator housing configured to releasably and non-rotatably attach to the mounting adapter without tools. The actuator housing may be attached at any one of a plurality of discrete radial orientations. In some instances, the actuator housing may include a spring retainer clip configured to engage the mounting adapter, and a button element configured to engage the spring retainer clip to release the spring retainer clip from the mounting adapter.

19 Claims, 16 Drawing Sheets

(56) References Cited

U.S. PATENT DOCUMENTS

| | | | |
|---|---|---|---|
| 5,806,555 | A | 9/1998 | Magno, Jr. |
| 5,808,534 | A * | 9/1998 | Laffey ............................ 335/250 |
| 5,954,088 | A | 9/1999 | Huang |
| 6,073,907 | A | 6/2000 | Schreiner, Jr. et al. |
| 6,422,258 | B1 * | 7/2002 | DuHack et al. ............. 137/15.09 |
| D480,450 | S | 10/2003 | Saadi et al. |
| 6,684,901 | B1 * | 2/2004 | Cahill et al. ............. 137/315.03 |
| 6,742,765 | B2 | 6/2004 | Takano et al. |
| 6,789,781 | B2 * | 9/2004 | Johnson et al. ............... 251/291 |
| D498,821 | S | 11/2004 | Nortier |
| 6,848,672 | B2 * | 2/2005 | Cross et al. ................... 251/292 |
| 6,880,806 | B2 | 4/2005 | Haikawa et al. |
| 6,994,320 | B2 * | 2/2006 | Johnson et al. ............... 251/291 |
| 7,048,251 | B2 | 5/2006 | Schreiner |
| 7,131,635 | B2 | 11/2006 | Oh |
| 7,188,481 | B2 | 3/2007 | DeYoe et al. |
| D543,003 | S | 5/2007 | Helmetsie |
| D571,290 | S | 6/2008 | Gebhart et al. |
| 7,395,718 | B2 | 7/2008 | Obermeier |
| D587,211 | S | 2/2009 | Greenslade |
| D610,655 | S | 2/2010 | Schmidt |
| D614,150 | S | 4/2010 | Crites |
| 7,704,008 | B2 * | 4/2010 | Shinozaki et al. ............ 403/397 |
| 7,708,254 | B2 | 5/2010 | Hertzog |
| D629,871 | S | 12/2010 | Marinoni et al. |
| D650,337 | S | 12/2011 | Bonomi |
| D654,523 | S | 2/2012 | Iranyi et al. |
| 2004/0089835 | A1 * | 5/2004 | Schreiner ...................... 251/291 |
| 2004/0099833 | A1 | 5/2004 | Haikawa et al. |
| 2004/0173770 | A1 * | 9/2004 | Kowalski ...................... 251/292 |
| 2006/0131532 | A1 * | 6/2006 | Oh ................................. 251/292 |
| 2011/0240893 | A1 * | 10/2011 | Windgassen ............. 251/129.13 |
| 2012/0199776 | A1 * | 8/2012 | Kreuter ......................... 251/292 |

FOREIGN PATENT DOCUMENTS

| | | |
|---|---|---|
| EP | 1672261 A1 | 6/2006 |
| EP | 1967777 | 9/2008 |
| WO | WO 2011/066328 | 6/2011 |

OTHER PUBLICATIONS

Honeywell, "MT4-024MT4-230 MT8-024/MT8-230 Small Linear Thermoelectric Actuators," Product Data, 5 pages, 2009.
Honeywell, "MT-CLIP—Mounting Clips for MT4/MT8," 1 Page, prior to Feb. 23, 2011.
Honeywell, "MT-CLIP-ATP Mounting Clips for MT4MT8," 2 pages, 2006.
Honeywell, "Small Linear Thermostat Actuator, MT4-0241MT4-230/MT8-024/MT8230," Mounting Instructions, 2 pages, 2006.
Honeywell, "VC6800, VC6900 Series Floating Control Valves," Product Data, 6 pages, Nov. 1996.
Search Report for Corresponding Application No. 12156608.7-2422 Dated Jun. 1, 2012.
U.S. Appl. No. 13/358,435, filed Jan. 25, 2012.
U.S. Appl. No. 29/408,681, filed Dec. 15, 2011.
Honeywell, "Dampers Actuators and Valves," Application and Selection Guide, 295 pages, Jan. 2011.
Honeywell, "Excel 10 W7751H3007 VAV Actuators," Installation Instructions, 10 pages, 2007.
Honeywell, "M5410 C1001/L1001 Small On/Off Linear Valve Actuators," Product Data, 4 pages, 2010.
Honeywell, "M6061 Rotary Valve Actuators," Product Data, 6 pages, 2011.
Honeywell, "ML6420A30xx/ML7420A60xx," Electric Linear Valve Actuators, Installation Instructions, 2 pages, 2010.
Honeywell, "ML6435B/ML7435E Electric Linear Actuators for Floating/Modulating Control," Installation Instructions, 2 pages, 2008.
Honeywell, "N20xx/N34xx Non-spring Return Direct-Coupled Damper Actuators," Wiring, 4 pages, 2012.
Honeywell, "Small Linear Thermoelectric Actuator, MT4-024/MT4-230/MT8-024/MT8-230," Mounting Instructions, 2 pages, 2007.
Honeywell, "VC2, VC4, VC60, VC8 On-Off Actuator for VC Series Balanced Hydronic Valves," Installation Instructions, 8 pages, 2011.
Honeywell, M5003A, 2 pages, Sep. 2010.
Honeywell, M6410C/L M7410C, 2 pages, prior to Feb. 23, 2011.
Honeywell, M7061 Installation Instructions, 2 pages, 2003.

* cited by examiner

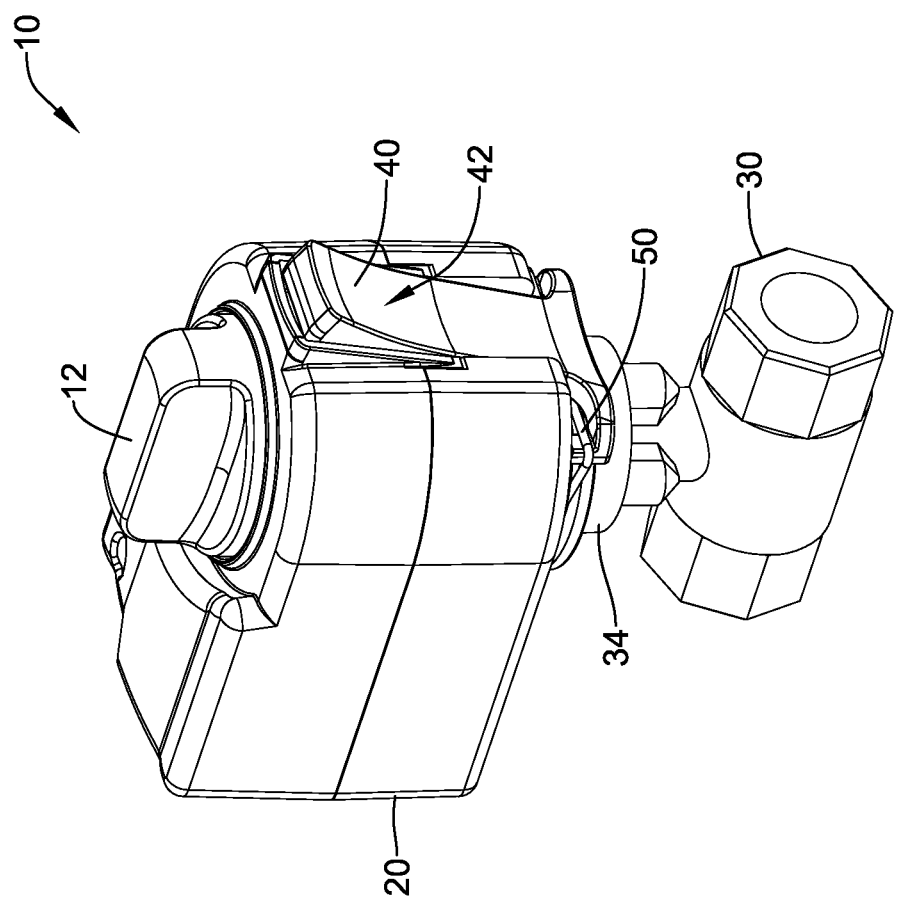

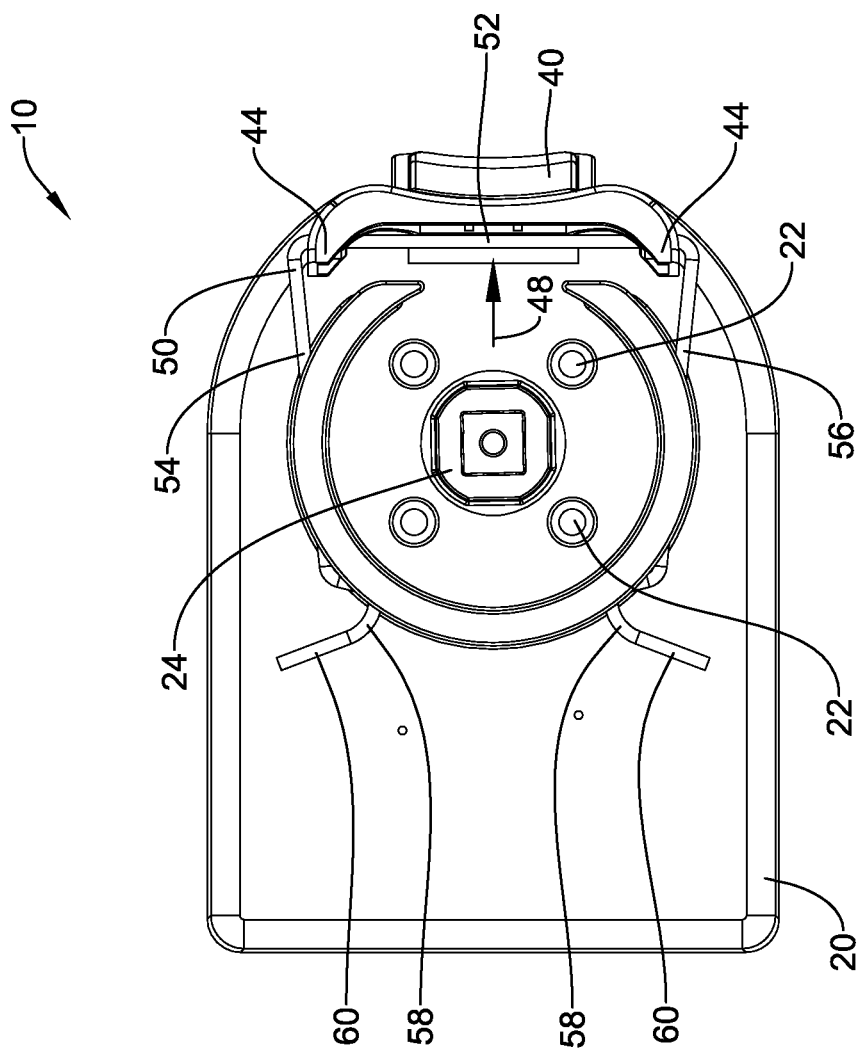

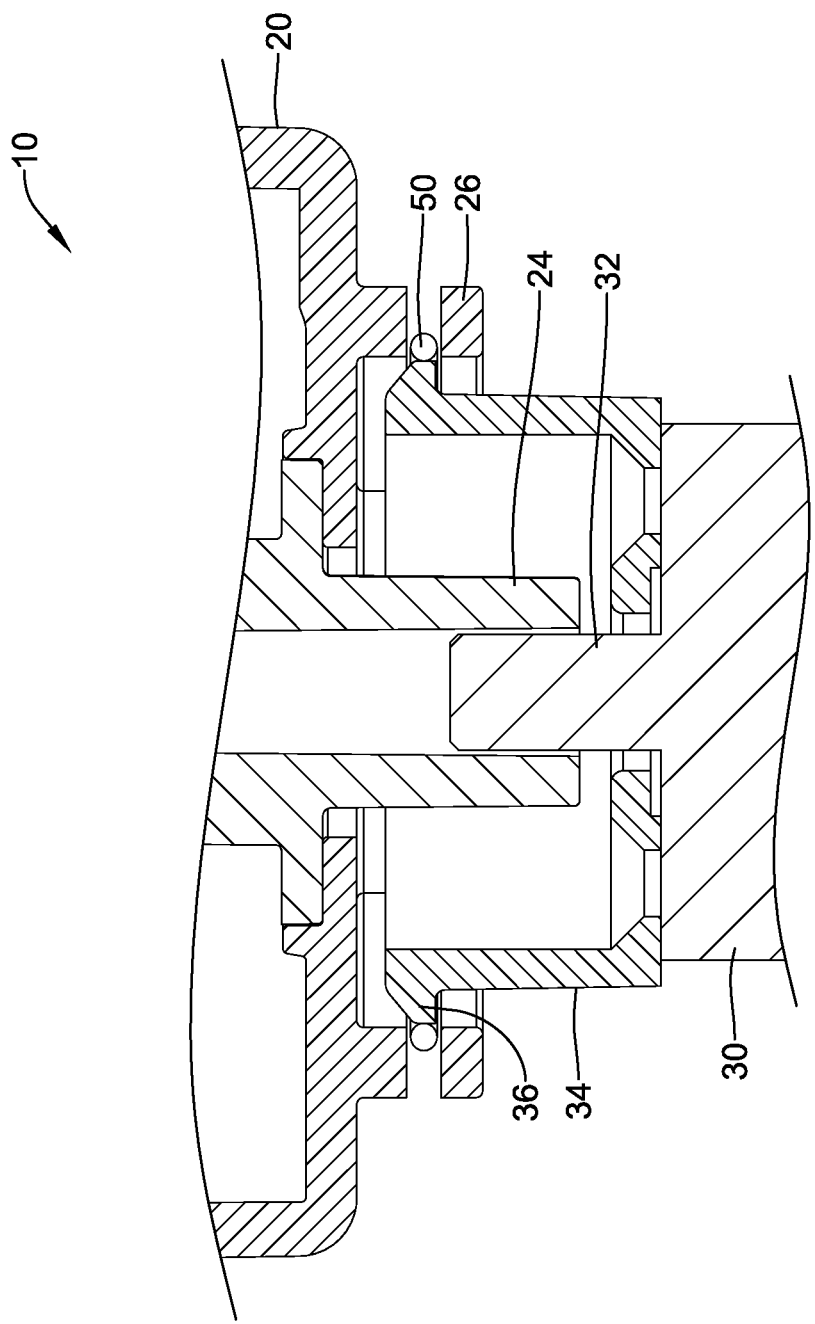

VALVE ACTUATOR ASSEMBLY WITH TOOL-LESS INTERCONNECT

TECHNICAL FIELD

The present disclosure pertains generally to valve actuator assemblies.

BACKGROUND

A variety of systems today include valves, and more particularly, actuatable valves assemblies. Buried sprinkler systems, for example, often include actuatable valves to control irrigation to lawns and other plants in both residential and commercial settings. In another example, fire prevention sprinkler systems often include one or more actuatable valves. In yet another example, many HVAC systems include actuatable valves such as air dampers, water valves, gas valves, ventilation flaps, louvers, and/or other actuatable valves that help regulate or control the flow of fluid (e.g. liquid or gas) in the HVAC system.

Many of the actuatable valves have a rotary axle or shaft that, during use, is actuated by a drive unit such as an electric motor or the like. In a direct coupled actuator, a shaft adapter is often configured to be placed over and coupled to the axle or shaft of the actuatable valve. Once installed, the drive unit may, through the shaft adapter, transmit a torque to the axle or shaft to actuate the actuatable valve.

In some instances, an actuator may include a drive train that is configured to drive an actuatable valve along a range of motion from a first position to a second position via a motor that is coupled to the drive train. In some cases, the drive train may function as a kind of transmission, taking a relatively high speed, low torque output from the motor and turning it into a relatively low speed, high torque output that is suitable for driving the actuatable valve between two or more positions. The drive train may be designed to provide an appropriate balance of speed and torque, depending on the physical characteristics and/or requirements of the corresponding actuatable valve. It will be appreciated, for example, that the torque needed to open and/or close an air damper may be quite different than the torque needed to open and/or close a liquid valve such as a ball valve. In some cases, the drive train may be configured to have an appropriate speed reduction and thus provide an appropriate level of torque. Such actuatable valves may be rotary, linear or any other suitable type, depending on the application.

Most HVAC systems include some sort of fluid delivery and/or circulation system. The fluid can be a liquid such as water or a gas such as air. Such fluid delivery and circulation systems often include a network of pipes or ducts. In many cases, one or more of the actuatable valves are used to control the fluid flow through all of part of the pipes or ducts of the distribution network. In some cases, the network of pipes or ducts is broken up into zones, where some or all of the zones can be independently controlled by one or more corresponding actuatable valves. The actuatable valves used to control the water (or other fluid) flow can be opened and closed to permit or prevent fluid flow to a particular zone. The valves can often be opened and closed by a valve actuator.

Many such systems are often located within walls, crawl spaces, or attic spaces of a structure. These areas are sometimes poorly illuminated and/or cramped, leaving little room for maintenance or other improvements. Installation of a valve actuator on a valve sometimes occurs in such cramped and poorly illuminated areas. Access to these and other areas for the use of tools or even a second hand can often be difficult and problematic. Thus, a need remains for an improved method of installing and/or maintaining an actuatable valve, especially in cramped and/or poorly illuminated areas.

SUMMARY

The present disclosure pertains generally to valve actuator assemblies, and more particularly, to valve actuator assemblies that have an actuator housing configured to releasably engage a valve without tools. An illustrative but non-limiting example of the disclosure may be found in a valve actuator assembly having an actuator housing that is configured to non-rotatably engage a mounting flange of a valve fixedly disposed about a valve actuation shaft. When so provided, the actuator housing may be releasably attached to the mounting flange in any one of a plurality of discrete radial orientations without tools. In some instances, the actuator housing may be connected to and/or released from the mounting flange without tools.

Another illustrative but non-limiting example of the disclosure may be found in a valve actuator mechanism that includes an actuator housing, a spacer element, and an external flange configured that is to engage a mounting adapter of a valve. A spring retainer clip may be disposed about the spacer element and cooperate with the spacer element to bias the spring retainer clip in a first lateral direction. The spring retainer clip may engage a retaining flange of the mounting adapter of the valve and lock the actuator assembly to the valve. The spring retainer clip may be configured to release the actuator housing from the mounting adaptor of the valve without tools. In some instances, a button element attached to the housing may be activated by a user to translate the spring retainer clip in a second lateral direction opposite the first lateral direction to release the actuator housing from the mounting adaptor of the valve without tools.

The present disclosure may be applied to any suitable actuatable valve assembly. For example, the present disclosure may be applied to any suitable HVAC actuatable valve assembly such as HVAC damper actuators used to actuate air dampers within air ducts, HVAC valve actuators used to actuate water valves within hydronic heating and/or cooling systems, other HVAC fluid or gas valves, and/or any other system elements, as desired.

The above summary is not intended to describe each disclosed embodiment or every implementation of the disclosure. The Description which follows more particularly exemplifies these embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 1 is a perspective view of an illustrative but non-limiting actuator housing and valve;

FIGS. 6A and 6B are bottom perspective views of the illustrative but non-limiting actuator housing of FIGS. 4 and 5, respectively;

FIGS. 9A-9C are partial cross-sectional views of an illustrative but non-limiting actuator housing in various stages of being attached to a valve in accordance with the present disclosure;

Figure 1A:
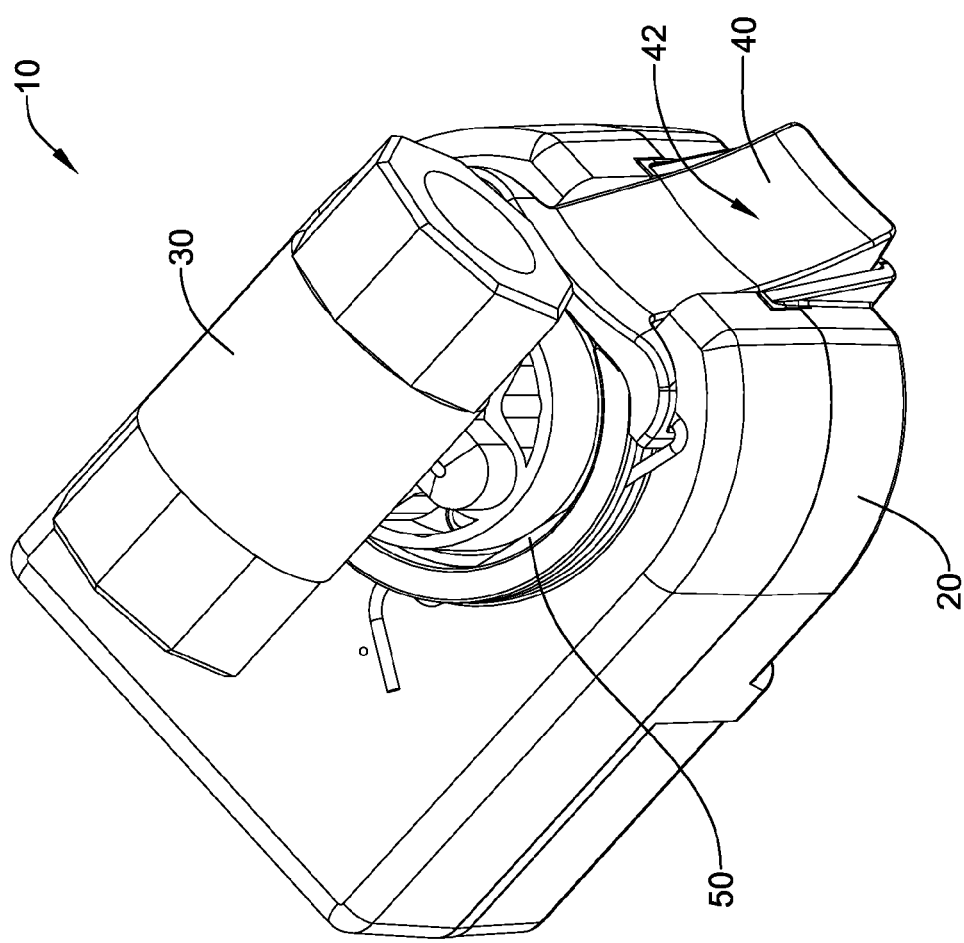
FIG. 1A is a bottom perspective view of an illustrative but non-limiting actuator housing and valve.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

FIG. 1 is a perspective illustration of a valve actuator assembly 10 that includes a valve 30 and an actuator housing 20. Valve 30 may be any type of valve such as a gate or ball valve, a plug or globe valve, or any other type of valve (such as a damper for use in an air duct). In the illustrative embodiments, the valve 30 can be opened or closed to permit or stop a fluid, such as water, or gas flow through valve 30. Valve 30 may include a valve actuation shaft 32 (see, for example, FIG. 11) that can operatively actuate internal components of the valve 30 between open and closed positions. Actuator housing 20 houses structure, such as an actuator (not explicitly shown), useful in actuating the valve actuation shaft 32 of valve 30 to move between open and closed positions in response to a command signal from a controller, such as a thermostat or the like.

In the illustrative embodiment, valve actuator assembly 10 can be employed in heating and cooling systems. In a heating system, a heat source such as a gas-fired or electric boiler may be used to heat water to a suitable temperature and a pump or other motive source is used to pump the heated water through a distribution network of pipes to one or more radiators, hot water baseboard heaters, encapsulated tubing such as in a radiant floor system, and/or the like. The distribution network can include water lines or pipes that extend from the heat source to one or several radiators and the like. In some embodiments, the distribution network can be deployed in a larger building such as an apartment or condominium building and can involve a large number of radiators, baseboard heaters or radiant floor systems, and in some cases multiple zones.

Regardless of system size, one or more valve actuator assemblies 10 can be plumbed into the distribution network to control the flow of the heated water through the system. In some instances, a single valve actuator assembly 10 can be used to regulate water flow through a single radiator or baseboard heater. In some embodiments, each valve actuator assembly 10 can be used to regulate water flow through several radiators or the like (e.g. to a particular zone).

The illustrative valve 30 may include a first fluid connection and a second fluid connection. Fluid flow through valve 30 can occur in either direction, although for exemplary purposes, the first fluid connection can be referred to as an inlet and the second fluid connection can be referred to as an outlet. In some embodiments, some valves can include three or more fluid connections. This can permit fluid to be diverted and continue to flow even if flow is stopped through a particular region of a distribution system. In addition, this can permit mixing of fluid from two of the inputs to the third, if desired.

Figure 8:
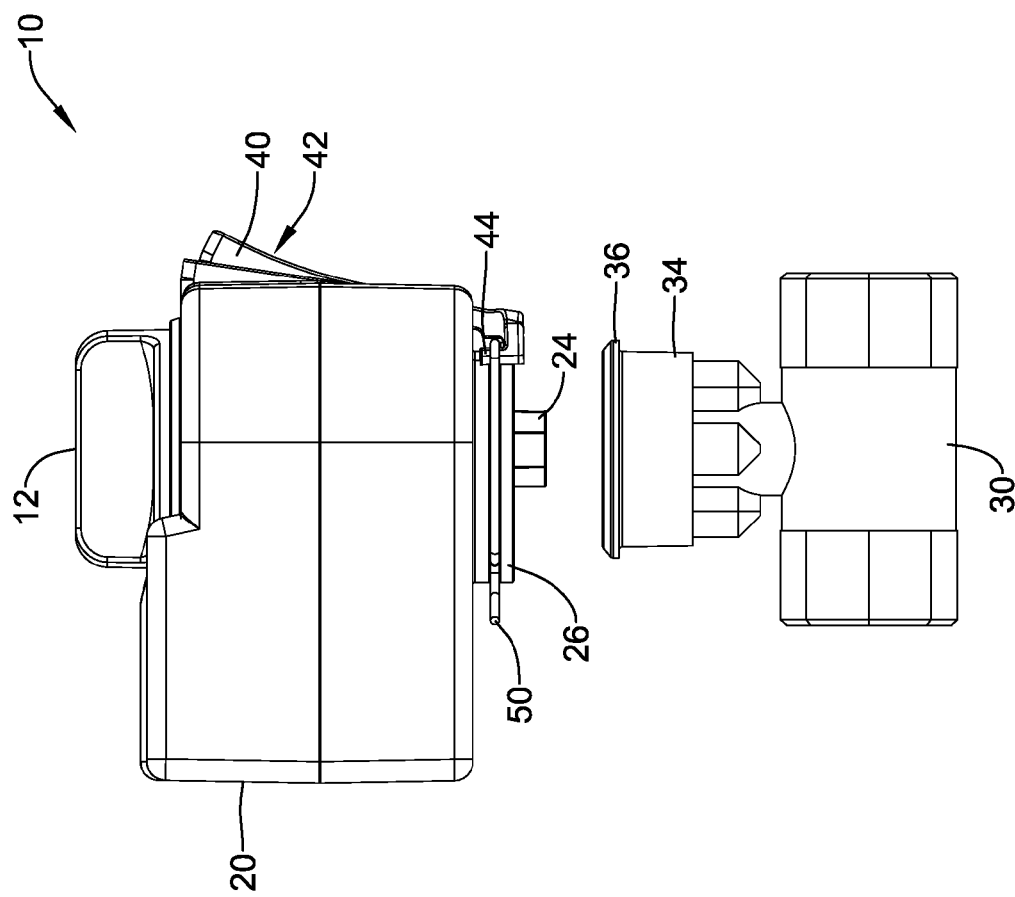
FIG. 8 is a side view of an illustrative but non-limiting actuator housing disconnected from a valve.
Figure 11:
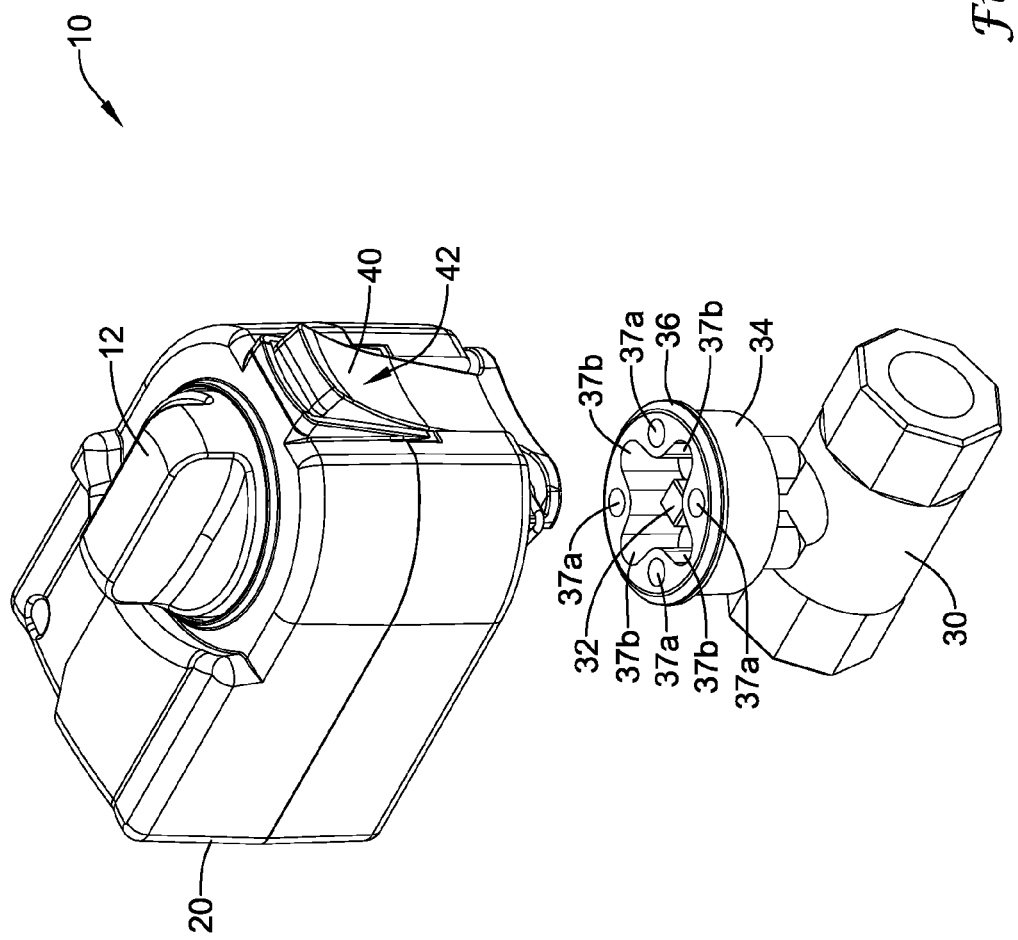
FIG. 11 is a perspective view of the illustrative but non-limiting actuator housing and valve of FIG. 8.

The illustrative valve 30 may include a mounting adapter 34. The mounting adapter 34 may be fixedly attached to valve 30, such as by welding, soldering, brazing, mechanical assembly, or the like, or it may be integrally formed with valve 30 as a unitary construction. In some embodiments, the mounting adapter 34 may be generally circular in nature, thereby forming a circular mounting adapter 34, but this is not required. The mounting adapter 34 may include a retaining flange 36 extending circumferentially about a perimeter of the mounting adapter 34, as best seen in FIGS. 8 and 11, for example. The mounting adapter 34 may be disposed about a central axis of the valve actuation shaft 32 such that the valve actuation shaft 32 passes through the mounting adapter 34, as seen in FIG. 11, for example. In some embodiments, the mounting adapter 34 may include a beveled outer edge, for reasons that will become apparent.

In some cases, the actuator housing 20 may include an indicator or knob 12 that may serve to show the current positioning of the internal components of the valve 30 (i.e., whether the valve is open, closed, or at some intermediate positioning). The actuator housing 20 may include an actuator disposed therein and operatively coupled to a shaft adapter 24 for actuating the valve actuation shaft 32 and the internal components of the valve 30. The knob 12 may also be operatively coupled to the shaft adapter 24 within the actuator housing 20. For example, as the valve actuation shaft 32 is rotated, the knob 12 may also rotate commensurately to indicate the current positioning of the internal components of the valve 30. In some embodiments, the knob 12 may serve as a means to manually actuate the valve actuation shaft 32 to manually move valve 30 between the open and closed positions, in the event of actuator or power failure, during diagnostic or trouble shooting, or for other reasons.

The actuator housing 20 may include an external flange 26, as best seen in FIGS. 3-10. The external flange 26 may be fixedly attached to the actuator housing 20 and spaced apart from the actuator housing 20 by a spacer element 28. In some embodiments, the spacer element 28 may be generally ring-like in nature, thereby forming an annular spacer element 28. In some cases, the spacer element 28 may be integrally formed with the actuator housing 20, but this is not required. The illustrative spacer element 28 may include a plurality of spaced transverse openings 16 (e.g., see FIG. 7A) extending from an exterior surface of the spacer element 28 to an interior surface of the spacer element 28, and a central space 18 disposed within the spacer element 28. In some embodiments, there may be at least three spaced transverse openings 16 through the spacer element 28, as shown in FIGS. 7A and 7B, for example. In some embodiments, the spaced transverse openings 16 are disposed between the actuator housing 20 and the external flange 26 so as to form closed passages transversely through the spacer element 28.

Figure 2:
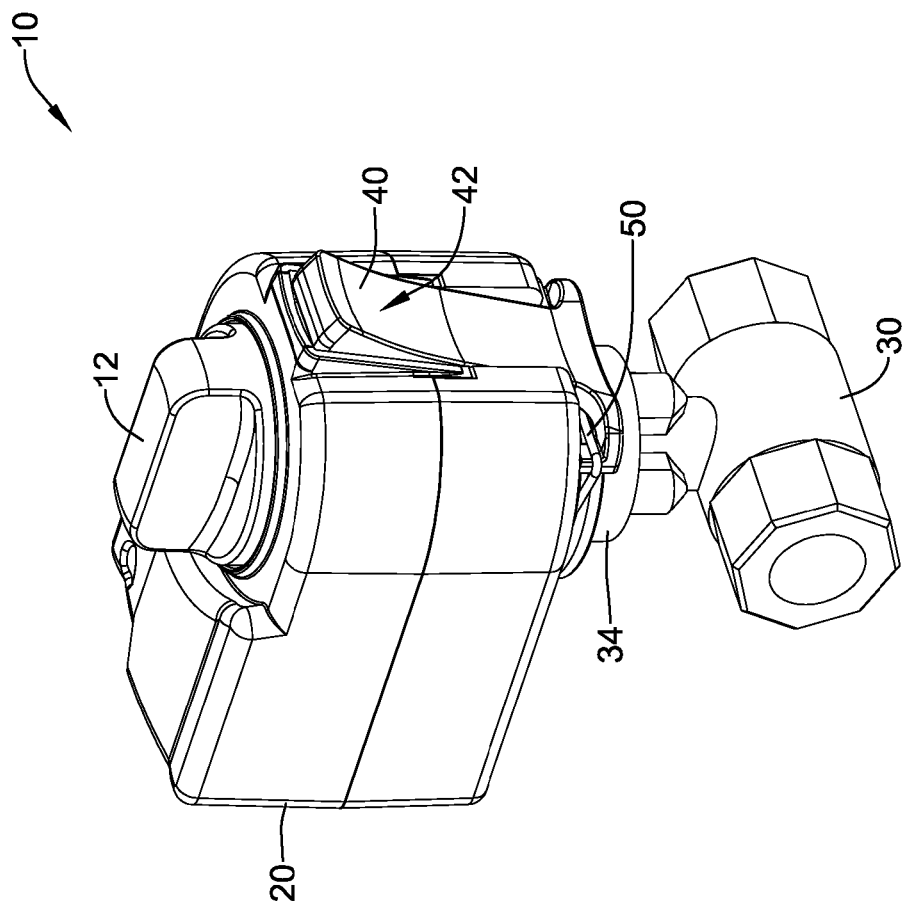
FIG. 2 is a perspective view of an illustrative but non-limiting actuator housing and valve attached at a different discrete radial orientation than FIG. 1.
Figure 3:
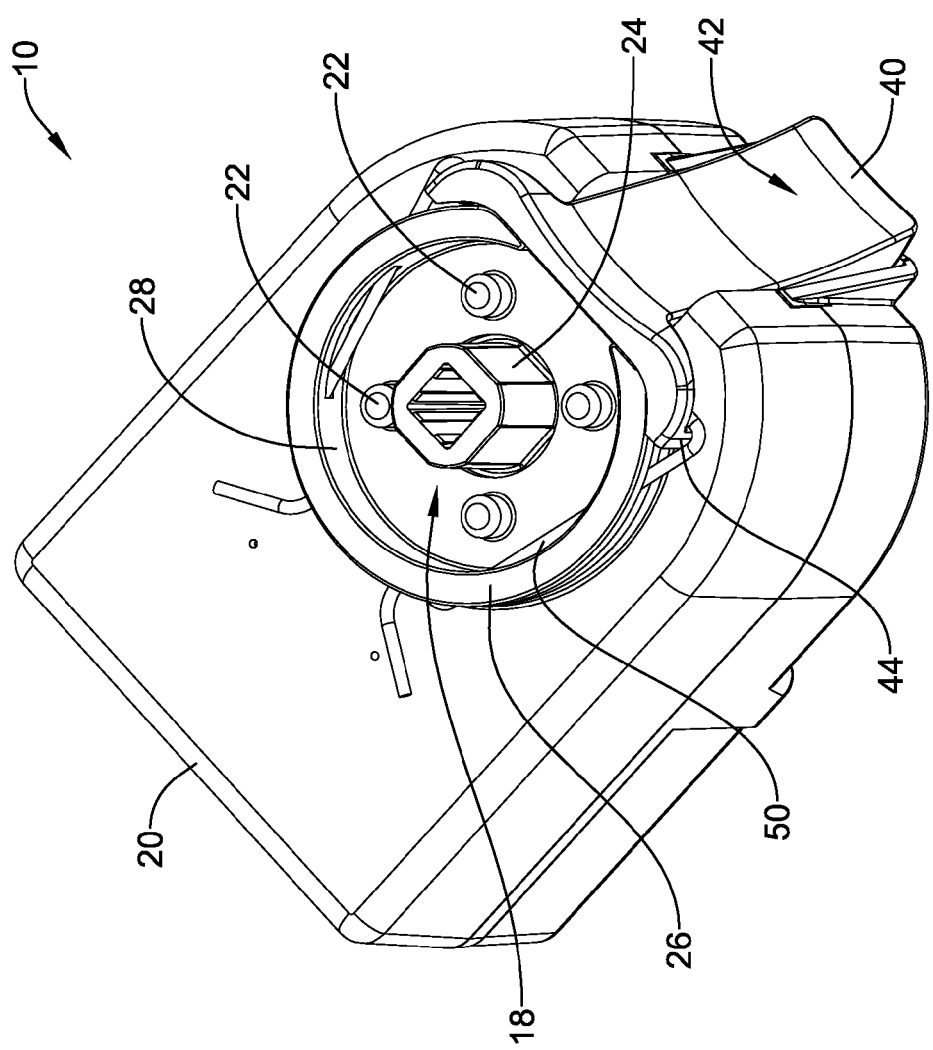
FIG. 3 is a bottom perspective view of an illustrative but non-limiting actuator housing.
Figure 4:
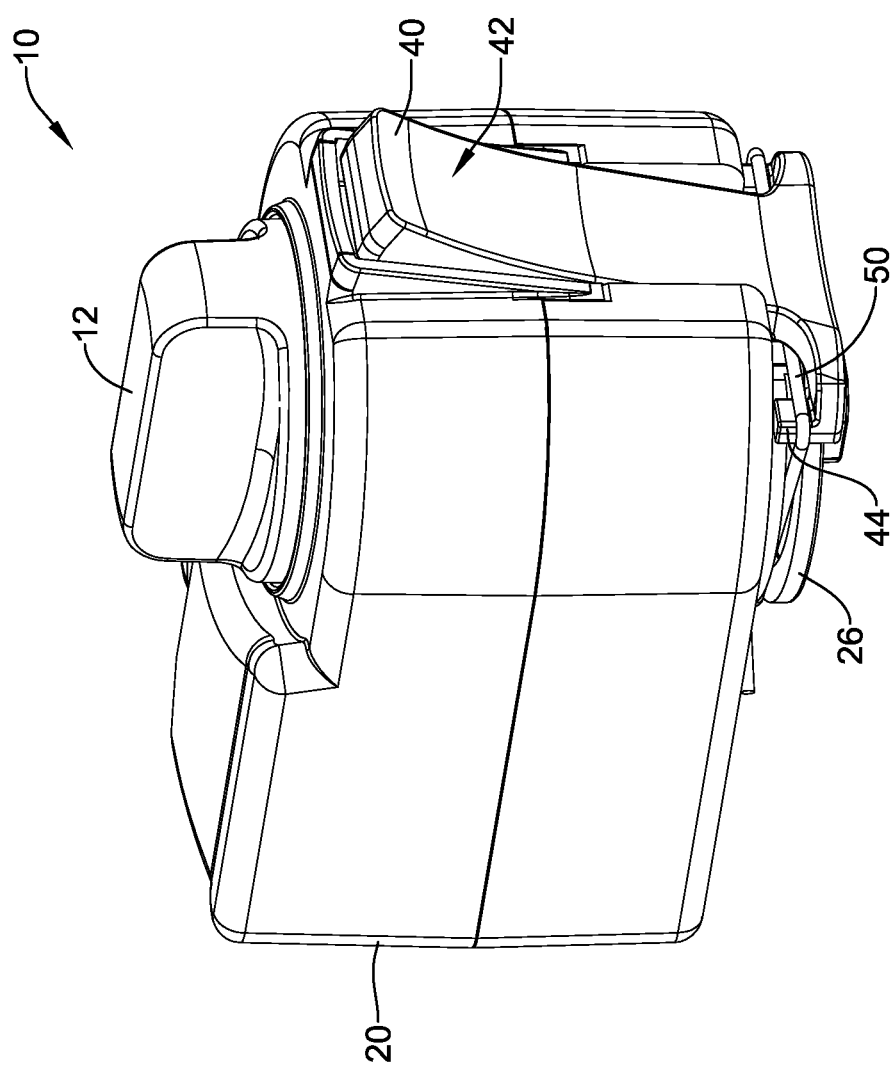
FIGS. 4 and 5 are perspective views of an illustrative but non-limiting actuator housing in different stages of actuation.

The actuator housing 20 may include a plurality of alignment elements 22 (e.g. see FIG. 3) configured to engage the mounting adapter 34. In some embodiments, the alignment elements 22 may be configured to be received within corresponding cavities 37a, 37b (e.g. see FIG. 11) in the mounting adapter 34. Engagement of the plurality of alignment elements 22 with the corresponding cavities 37a, 37b in the mounting adapter 34 may prevent rotational movement of the actuator housing 20 relative to the valve 30 and permit torque transfer from the actuator to the valve actuation shaft 32 via the shaft adapter 24. The alignment elements 22 and the mounting adapter 34 may be configured such that the actuator housing 20 and the mounting adapter 34 may be engaged in any one of a plurality of discrete radial orientations about the valve actuation shaft 32. For example, the actuator housing 20 and the valve 30 may be generally aligned and/or oriented at about 0 degrees relative to each other, as depicted in FIG. 1, the actuator housing 20 and the valve 30 may be generally transverse and/or oriented at about 90 degrees relative to each other, as depicted in FIG. 2, or the actuator housing 20 and the valve 30 may be configured to be oriented at other angles relative to each other as suitable for a particular application.

The actuator housing 20 may include a spring retainer clip 50 configured to releasably attach, secure, and/or lock the actuator housing 20 to the mounting adapter 34. The spring retainer clip 50 may be disposed about the spacer element 28, and within a groove or slot between the actuator housing 20 and the external flange 26. The spring retainer clip 50 may include at least three substantially straight segments 52, 54, 56 separated by corners or bends. In the illustrative embodiment, the spring retainer clip 50 has a generally triangular shape, as seen in FIGS. 6A-7B for example, with a first substantially straight segment 52 being disposed between the other two substantially straight segments 54, 56. The other two substantially straight segments 54, 56 may include free ends 60 opposite where they are joined to the first substantially straight segments 52. Each of the free ends 60 is shown extending outward away from each other adjacent a bent portion 58 disposed between the free ends 60 and the adjacent substantially straight segments 54, 56. The bent portions 58 cooperate with the spacer element 28 (e.g. see, FIG. 7A) to bias the spring retainer clip 50 in a first lateral direction away from the first substantially straight segment 52 toward the free ends 60 to a first position. In the first position, each of the substantially straight segments 52, 54, 56 extends at least partially through one of the at least three spaced transverse openings 16 (e.g., see, FIG. 7A). When the first substantially straight segment 52 is translated in a second lateral direction opposite the first lateral direction, or laterally away from the central space 18 toward the first substantially straight segment 52 (as indicated by arrow at reference numeral 48 in FIGS. 6B and 7B), to a second position where the spring retainer clip 50 does not extend through any of the at least three spaced transverse openings 16, the bent portions 58 cooperate with the spacer element 28 to translate the other two substantially straight segments 54, 56 outward as they translate in the second lateral direction.

Figure 9A:
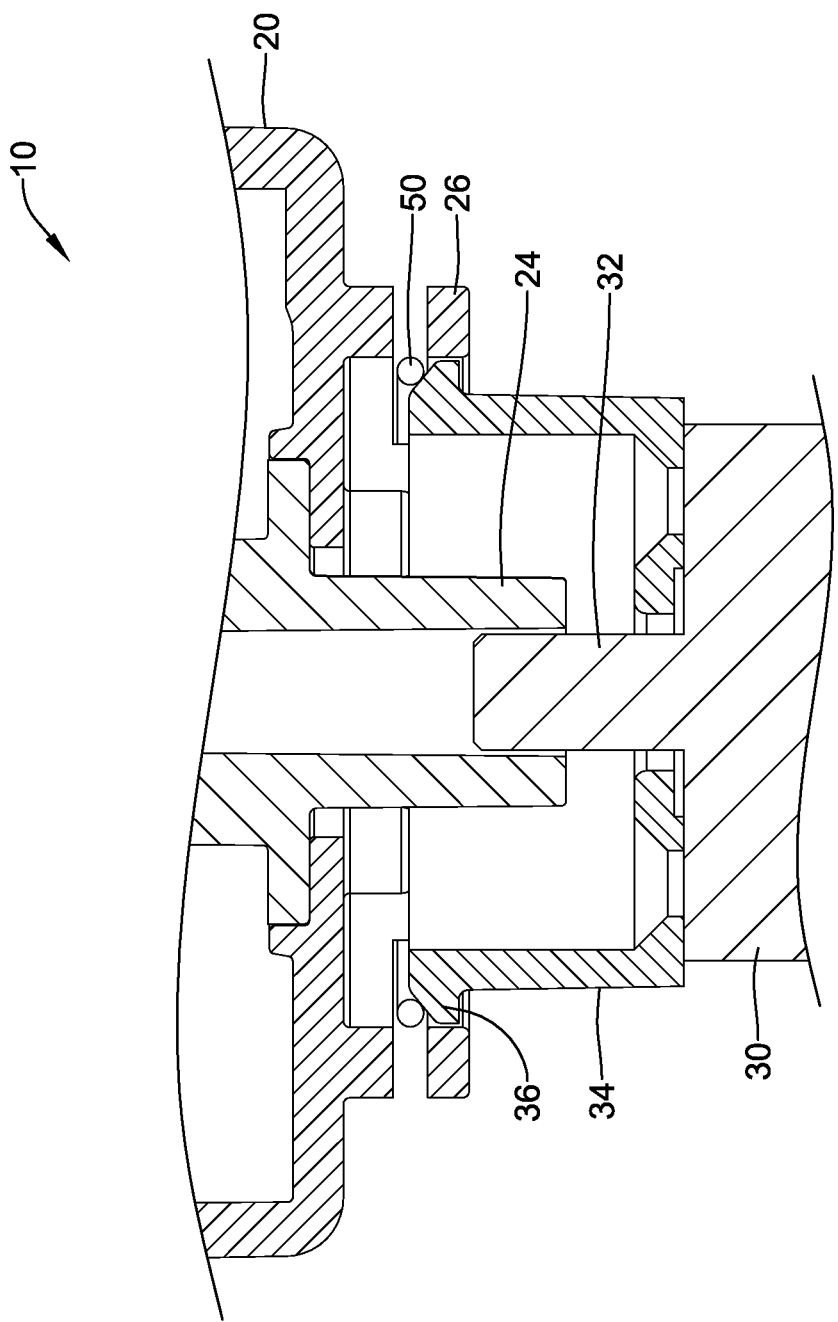
Figure 9C:
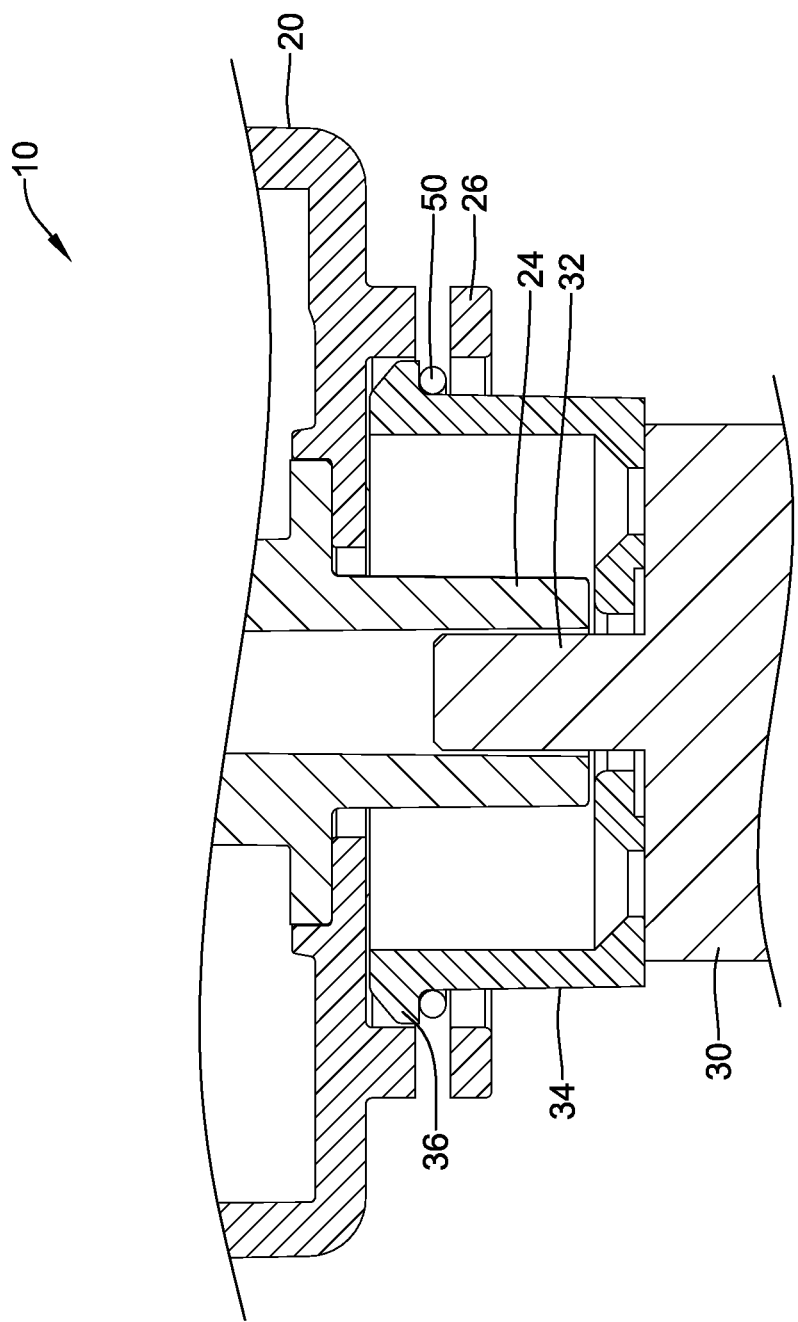
Figure 10:
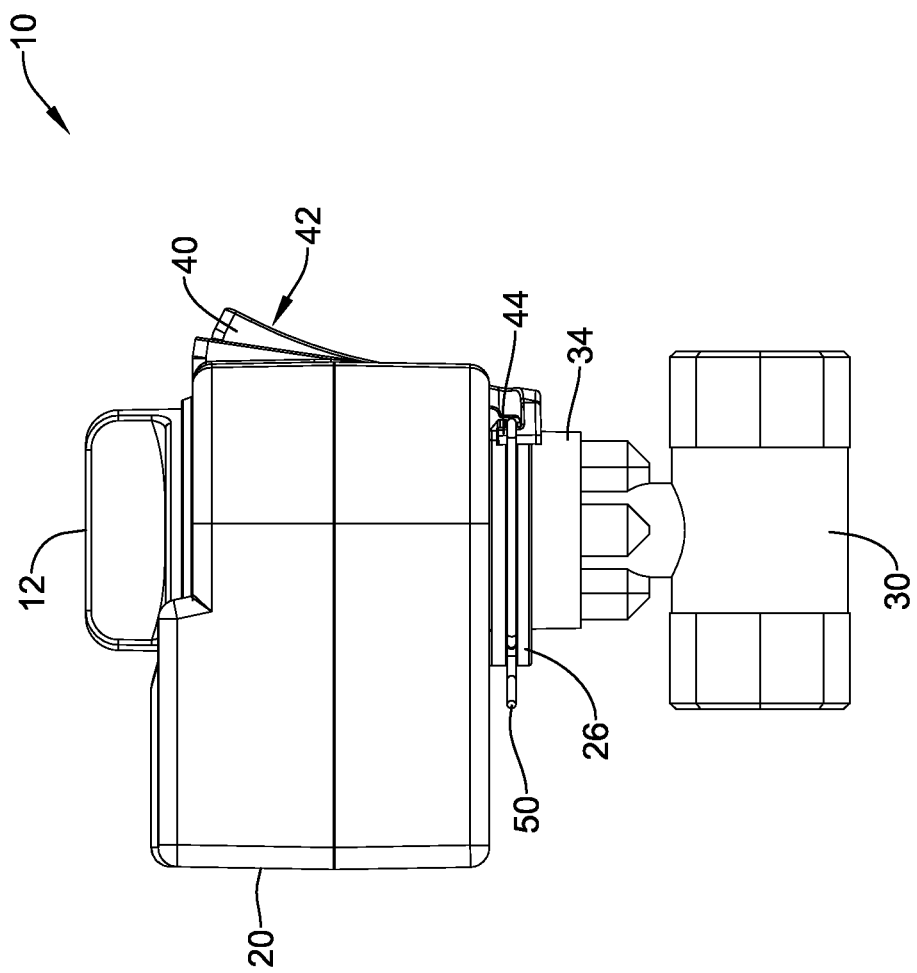
FIG. 10 is a side view of an illustrative but non-limiting actuator housing connected to a valve.

When the mounting adapter 34 of the valve 30 is inserted axially into the central space 18, as best illustrated in FIGS. 8-10, the spring retainer clip 50 may engage a beveled outer edge of the retaining flange 36 of mounting adapter 34 in a plurality of discrete locations (e.g. see, FIG. 9A). In some embodiments, the spring retainer clip 50 may engage the retaining flange 36 of the mounting adapter 34 in at least two discrete locations. In some embodiments, the spring retainer clip 50 may engage the retaining flange 36 in at least three discrete locations. In some embodiments, the discrete locations may correspond to the spaced transverse openings 16 of spacer element 28. As the mounting adapter 34 is inserted into the central space 18, the alignment elements 22 may engage the mounting adapter 34 and the substantially straight segments 52, 54, 56 of the spring retainer clip 50 may be spread apart and move out of the central space 18, thereby allowing the retaining flange 36 to move past the spring retainer clip 50. Once the retaining flange 36 has moved past the spring retainer clip 50 (e.g. see, FIG. 9C), the spring retainer clip 50 may return to an unexpanded configuration in the first position, securing the retaining flange 36 within the central space 18 to lock the actuator housing 20 to the valve 30. As can be seen, the spring retainer clip 50 may be configured such that the actuator housing 20 can be attached to the mounting adapter 34 without tools.

In order to release the actuator housing 20 from the mounting adapter 34, the actuator housing 20 may be provided with, for example, a button element 40. In the illustrative embodiment, the button element 40 includes two spaced-apart arms 44 configured to engage the spring retainer clip 50 at two spaced-apart locations along the first substantially straight segment 52, but this is not required in all embodiments. In some embodiments, the two spaced-apart locations may be disposed outside of the external flange 26. A force application region 42 may be disposed opposite the two spaced-apart arms 44 such that the button element 40 may pivot about a pivot axis (not explicitly illustrated) disposed between the spring retainer clip 50 and the force application region 42 when force is applied to the force application region 42 in the first lateral direction.

Figure 5:
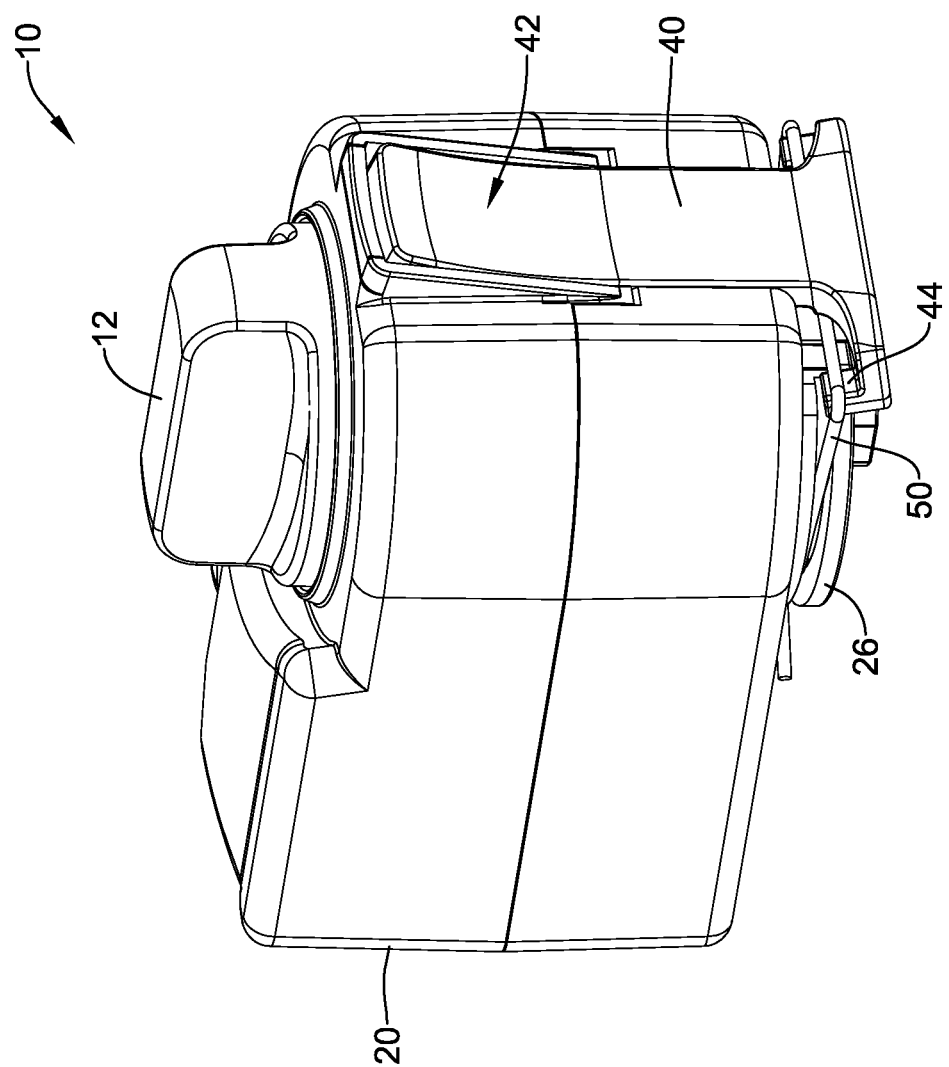
Figure 6A:
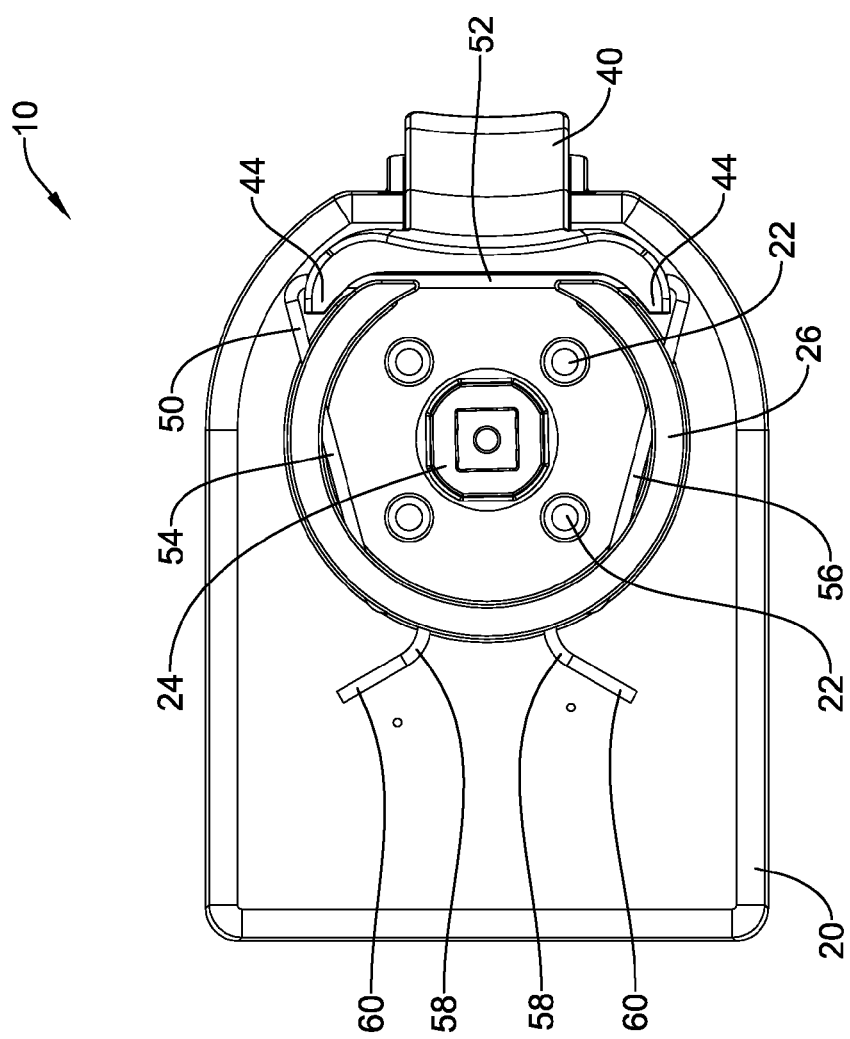
Figure 7A:
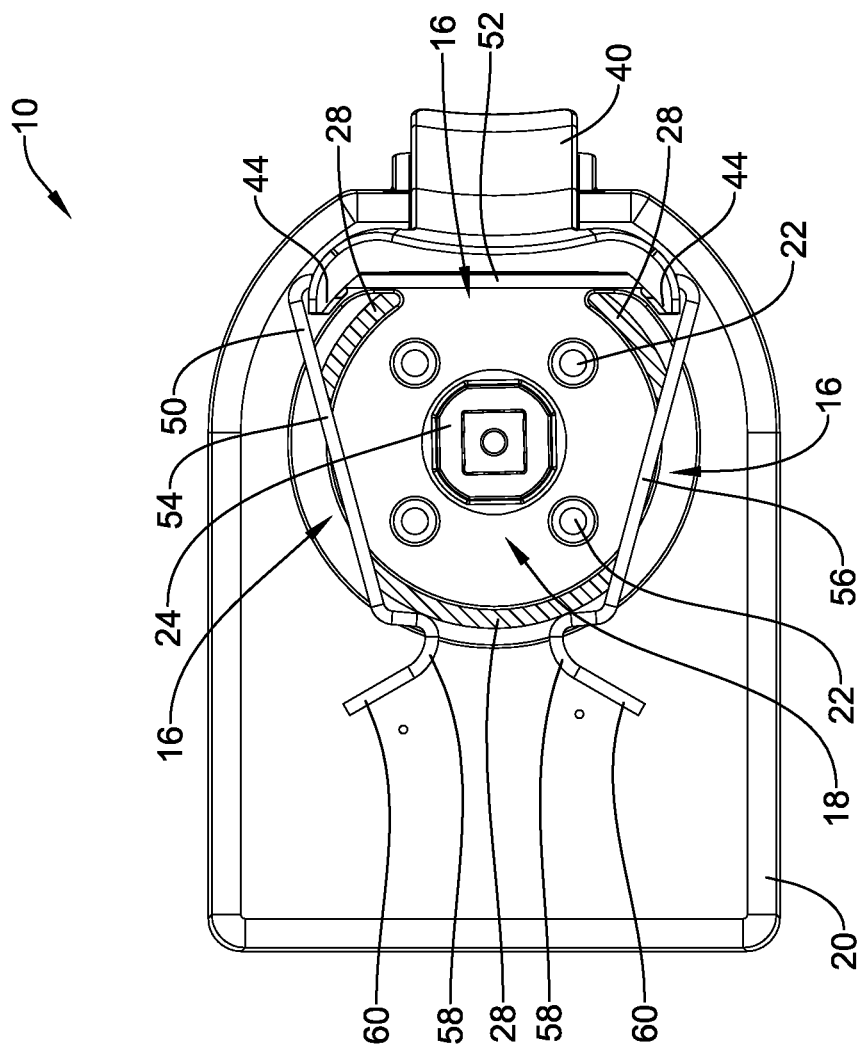
FIGS. 7A and 7B are partial cross-sectional views of the illustrative but non-limiting actuator housing of FIGS. 6A and 6B, respectively, cutting through the spacer element.
Figure 7B:
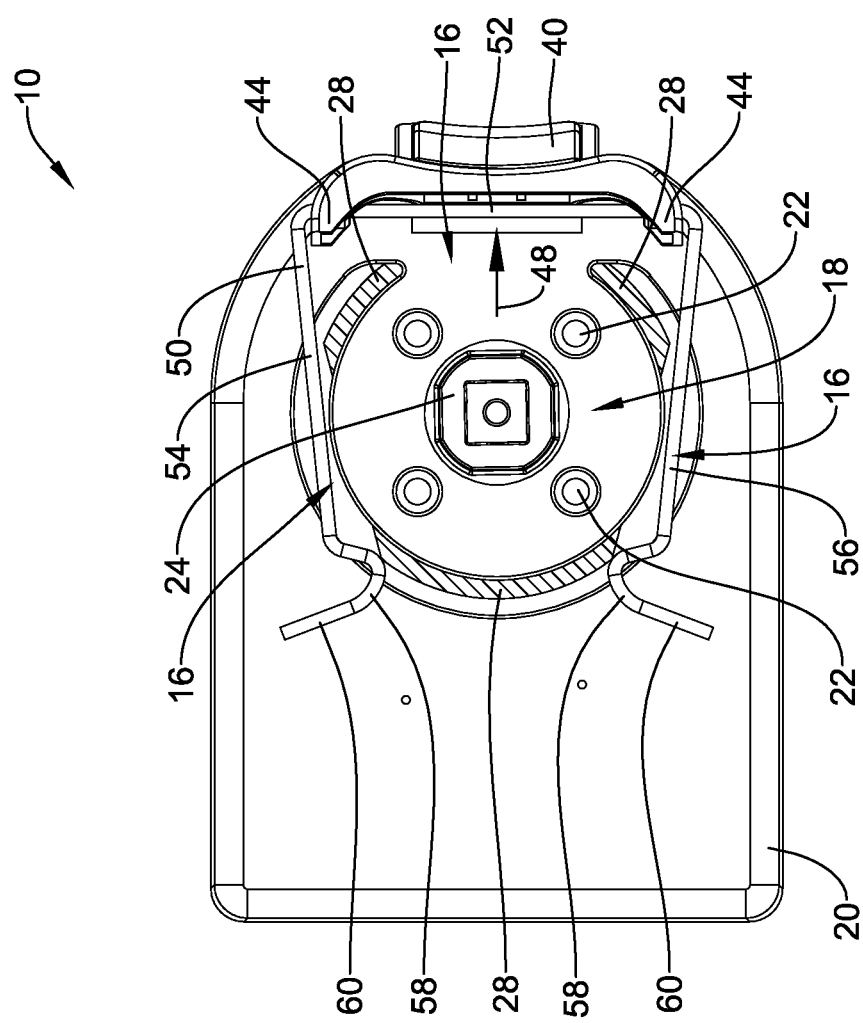

Upon applying force in the first lateral direction to the force application region 42, the two spaced-apart arms 44 may translate the first substantially straight segment 52 away from the central space 18 in the second lateral direction, as illustrated in FIGS. 5, 6B, and 7B. Translating the first substantially straight segment 52 in the second lateral direction may translate the other two substantially straight segments 54, 56 outward from the central space 18 and in the second lateral direction, such that the spring retainer clip 50 is disposed in the second position, as best illustrated in FIGS. 6A-7B, and the spring retainer clip 50 does not extend through any of the spaced transverse openings 16. When the spring retainer clip 50 is disposed in the second position, the actuator housing 20 may be removed from the mounting adapter 34. Button element 40 may permit the release of actuator housing 20 from the mounting adapter 34 without tools, for easy one-handed removal of the actuator housing 20 from the valve 30.

In some embodiments, the button element 40 may not pivot about a pivot axis disposed between the spring retainer clip 50 and the force application region 42 when a force is applied to the force application region 42 in the first lateral direction. Instead, the button element 40 may include, for example, a wedge-shaped design configured to accept a force applied to a force application region in a transverse direction to the first and second lateral directions, or generally toward the valve 30. The wedge-shaped button may be slidingly attached to the housing 20 such that the first substantially straight segment 52 rides up a ramp and translates the spring retainer clip 50 in the second lateral direction as the button element slides in the transverse direction toward the valve 30. In another example, button element 40 may include a rotary design configured to accept a rotary force applied to the button element. In this instance, the button element may be rotatably attached to the housing 20 and include an increasing ramp portion about its circumference that is configured to translate the spring retainer clip 50 in the second lateral direction as the button element is rotated and the ramp portion engages the first substantially straight segment 52. Any suitable button configuration that is coupled to the housing 20 and translates the spring retainer clip 50 in the second lateral direction may be used.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

We claim:

1. A valve actuator assembly, for connection to a valve that has a valve actuation shaft and a mounting adapter fixedly disposed about the valve actuation shaft, the valve actuator assembly comprising:
    an actuator housing configured to non-rotatably engage the mounting adapter of the valve;
    wherein the actuator housing is releasably attachable to the mounting adapter of the valve in any one of a plurality of discrete radial orientations about the valve actuation shaft without tools;
    wherein the actuator housing is releasable from the mounting adapter of the valve without tools;
    wherein the actuator housing includes a spacer element having a spacer wall extending outwardly from the actuator housing, the spacer wall defining a central space that is configured to receive at least part of the mounting adapter of the valve, the spacer wall including at least one transverse opening extending transversely through the spacer wall and into the central space; and
    a securing member configured to translate transversely at least partially through the at least one transverse opening in the spacer wall;
    wherein with the central space receiving at least part of the mounting adapter of the valve, the securing member is configured to releasably secure the mounting adapter of the valve to the actuator housing of the valve actuator assembly; and
    wherein the actuator housing includes a plurality of alignment elements configured to be received within the mounting adapter.

2. The valve actuator assembly of claim 1, wherein the securing member includes a spring retainer clip configured to releasably attach the actuator housing of the valve to the mounting adapter in any one of the plurality of discrete radial orientations.

3. The valve actuator assembly of claim 2, wherein the spring retainer clip is configured to engage the mounting adapter of the valve in at least three discrete spaced locations.

4. A valve actuator assembly, for connection to a valve that has a valve actuation shaft and a mounting adapter fixedly disposed about the valve actuation shaft, the valve actuator assembly comprising:
    an actuator housing configured to non-rotatably engage the mounting adapter of the valve;
    wherein the actuator housing is releasably attachable to the mounting adapter of the valve in any one of a plurality of discrete radial orientations about the valve actuation shaft without tools;
    wherein the actuator housing is releasable from the mounting adapter of the valve without tools;
    wherein the actuator housing includes a spacer element having a spacer wall extending outwardly from the actuator housing, the spacer wall defining a central space that is configured to receive at least part of the mounting adapter of the valve, the spacer wall including at least one transverse opening extending transversely through the spacer wall and into the central space; and
    a securing member configured to translate transversely at least partially through the at least one transverse opening in the spacer wall;
    wherein with the central space receiving at least part of the mounting adapter of the valve, the securing member is configured to releasably secure the mounting adapter of the valve to the actuator housing of the valve actuator assembly;
    wherein the securing member includes a spring retainer clip configured to releasably attach the actuator housing of the valve to the mounting adapter in any one of the plurality of discrete radial orientations; and
    wherein the actuator housing further includes a button element having two spaced-apart arms disposed opposite a force application region, wherein the two spaced-apart arms are configured to engage the spring retainer clip and translate the spring retainer clip in a second lateral direction when the button element is pivoted about a pivot axis disposed between the spring retainer clip and the force application region by applying force to the force application region in a first lateral direction opposite the second lateral direction.

5. A valve actuator mechanism, for connection to a valve that has a mounting adapter having a retaining flange extending circumferentially about the mounting adapter, the valve actuator mechanism comprising:
    an actuator assembly including an actuator and a housing, the housing having an external flange fixedly attached thereto and spaced therefrom by a spacer element;
    wherein the spacer element is sized to receive the mounting adapter within a central space thereof and includes at least three spaced transverse openings extending therethrough to the central space;
    a spring retainer clip disposed about the spacer element between the housing and the external flange in a first position, such that the spring retainer clip extends at least partially through at least three of the at least three spaced transverse openings;
    wherein the spring retainer clip cooperates with the spacer element to bias the spring retainer clip in a first lateral direction to the first position; and
    wherein when the mounting adapter of the valve is disposed within the central space, the spring retainer clip engages the retaining flange and locks the housing to the valve, and the spring retainer clip is configured to release the housing from the valve without tools.

6. The valve actuator mechanism of claim 5, wherein the spring retainer clip includes three substantially straight segments and each segment extends at least partially through one of the at least three spaced transverse openings in the first position.

7. The valve actuator mechanism of claim 6, wherein the spring retainer clip engages the mounting adapter in at least three discrete locations.

8. The valve actuator mechanism of claim 5, wherein the housing is non-rotatably locked to the valve in any one of a plurality of discrete radial orientations.

9. The valve actuator mechanism of claim 5, further comprising a button element configured to translate the spring retainer clip in a second lateral direction opposite the first lateral direction to a second position where the spring retainer clip does not extend through any of the at least three spaced transverse openings.

10. A valve actuator mechanism, for connection to a valve having a valve actuation shaft and a circular mounting adapter having a retaining flange extending circumferentially about the circular mounting adapter, the circular mounting adapter disposed about an axis of the valve actuation shaft, the valve actuator mechanism comprising:
an actuator assembly including an actuator and a housing, the housing having an external flange fixedly attached thereto and spaced therefrom by an integrally-formed annular spacer element;
wherein the annular spacer element is sized to axially receive the circular mounting adapter of the valve within a central space of the annular spacer element, and wherein the annular spacer element includes at least three spaced transverse openings extending therethrough to the central space;
a spring retainer clip disposed about the annular spacer element between the housing and the external flange in a first position, such that the spring retainer clip extends at least partially through each of the at least three spaced transverse openings;
wherein the spring retainer clip cooperates with the annular spacer element to bias the spring retainer clip in a first lateral direction to the first position; and
a button element pivotably attached to the housing and two spaced-apart arms engaged with the spring retainer clip such that pivoting the button element translates the spring retainer clip in a second lateral direction opposite the first lateral direction to a second position where the spring retainer clip does not extend through any of the at least three spaced transverse openings;
wherein when the circular mounting adapter of the valve is disposed within the central space of the annular spacer element, the spring retainer clip engages the retaining flange of the valve and locks the housing to the valve in the first position, and the spring retainer clip disengages from the retaining flange of the valve and releases the housing from the valve in the second position.

11. The valve actuator mechanism of claim 10, wherein the spring retainer clip includes three substantially straight segments and each segment extends at least partially through one of the at least three spaced transverse openings in the first position.

12. The valve actuator mechanism of claim 11, wherein the two spaced-apart arms engage the spring retainer clip at two spaced-apart locations along a first of the three substantially straight segments, the two spaced-apart locations being disposed outside of the external flange.

13. The valve actuator mechanism of claim 12, wherein the spring retainer clip engages the retaining flange in at least two discrete locations, the retaining flange engaging the first of the three substantially straight segments at one of the at least two discrete locations.

14. The valve actuator mechanism of claim 13, wherein when the button element is pivoted, the two spaced-apart arms are configured to translate the first of the three substantially straight segments laterally away from the central space in the second lateral direction and the other two substantially straight segments are configured to translate outward from the central space and in the second lateral direction.

15. The valve actuator mechanism of claim 10, wherein the housing includes a plurality of alignment elements configured to engage the circular mounting adapter.

16. The valve actuator mechanism of claim 15, wherein engagement of the plurality of alignment elements with the circular mounting adapter prevents rotational movement of the housing relative to the valve.

17. The valve actuator mechanism of claim 16, wherein the housing engages the circular mounting adapter in any one of a plurality of discrete radial orientations about the valve actuation shaft.

18. The valve actuator mechanism of claim 10, wherein the circular mounting adapter includes a beveled outer edge.

19. The valve actuator mechanism of claim 10, wherein the at least three spaced transverse openings through the annular spacer element into the central space are disposed between the housing and the external flange.

* * * * *